(12) United States Patent
Xiao et al.

(10) Patent No.: US 8,484,007 B2
(45) Date of Patent: Jul. 9, 2013

(54) METHOD AND APPARATUS OF HANDLING INSTRUCTION REJECTS, PARTIAL REJECTS, STALLS AND BRANCH WRONG IN A SIMULATION MODEL

(75) Inventors: Wei-Yi Xiao, Poughkeepsie, NY (US); Michael P. Mullen, Poughkeepsie, NY (US); Vasantha R. Vuyyuru, Round Rock, TX (US); Robert J. Adkins, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 12/032,647

(22) Filed: Feb. 16, 2008

(65) Prior Publication Data

US 2009/0210681 A1 Aug. 20, 2009

(51) Int. Cl.
*G06F 17/50* (2006.01)
(52) U.S. Cl.
USPC ............................................................ 703/14
(58) Field of Classification Search
USPC ................................ 703/14; 715/227; 712/214
See application file for complete search history.

(56) References Cited

U.S. PATENT DOCUMENTS

| 5,179,672 | A | * | 1/1993 | Genduso et al. | 713/600 |
| 5,261,063 | A | * | 11/1993 | Kohn et al. | 712/229 |
| 5,673,425 | A | * | 9/1997 | Iwashita | 712/227 |
| 6,237,081 | B1 | * | 5/2001 | Le et al. | 712/214 |
| 2006/0184772 | A1 | | 8/2006 | Dooley et al. | |
| 2006/0184778 | A1 | * | 8/2006 | Levitan et al. | 712/239 |

* cited by examiner

*Primary Examiner* — Omar Fernandez Rivas
*Assistant Examiner* — Bernard E Cothran
(74) *Attorney, Agent, or Firm* — Cantor Colburn LLP; John Campbell

(57) ABSTRACT

A method and apparatus of handling instruction rejects, partial rejects, stalls and branch wrong in a simulation model provides pipeline states for various unit verification. It defines an instruction train to encounter many events of the hardware verifications. Drivers and monitors at a unit and a core simulation level can hook into the pipeline states and perform the verification easily without having to restructure the instructions in the pipeline due to rejects, partial rejects, stalls, branch wrongs. Different event counters have been placed in the instruction pipe during the events and expand the instruction train such that the instruction train provides an accurate and detailed state of each instruction so the hardware logic signals and data can be tracked and identified from each state.

20 Claims, 7 Drawing Sheets

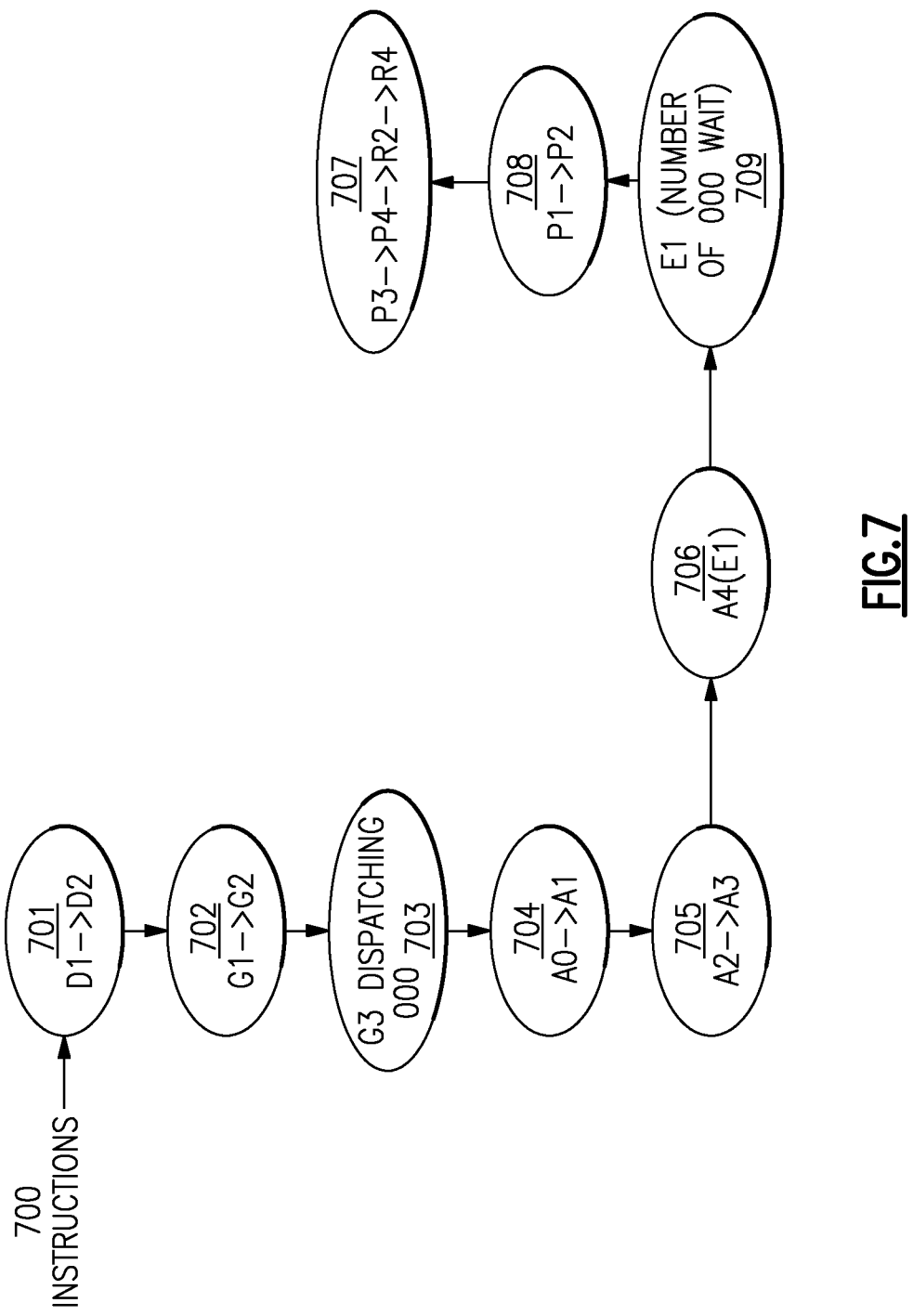

METHOD AND APPARATUS OF HANDLING INSTRUCTION REJECTS, PARTIAL REJECTS, STALLS AND BRANCH WRONG IN A SIMULATION MODEL

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to processor design simulation and particularly to a method and apparatus of handling instruction rejects, partial rejects, stalls and branch wrong in a simulation model.

2. Description of Background

In today's complex processor designs, simulation often breaks into small units for easy verification and better chances of finding more bugs at the unit levels. At unit level simulations, various monitors will be in place to monitor various functions and signals depending on the functions at each unit. In the last decade IBM has used various hierarchical verification approaches using simulation engines at the unit and chip level, such as using the SIMAPI user interface for simulation at macro levels, and commercially available VHDL event simulators have been used, such as the cycle simulator TEXSIM and ZFS to perform cycle simulation for the S/390 machines. This work has continued with multi-unit level simulations and multiple chip, system level for early validation of a processor design prior to completing the design in a hardware definition language (HDL). However, simulation requires a lot of staffing for verification, and improvements are desirable, especially those able to be applied to architectures which can include reduced-instruction-set computers and traditional CISC architectures such as the IBM System z machines and Intel architectures.

SUMMARY OF THE INVENTION

The processor design can perform reject, partial reject, stall and branch wrongs (early and late), "xconds" (pre-conditions/exceptions/serialization) on the instructions during various stages of the processor design due to timing of fetching data from cache, or stall the execution due to timing from decode unit. A branch can be mis-predicted and caused wrong direction and wrong target of the instructions and address mode changes can cause exceptions. To ensure the design cleans up its interface design signals and restarts its function correctly after instructions are being recycled due to rejects, partial rejects, stall and branch wrongs and xconds, and not have to rewrite the same functions over again in different simulation units, the method of breaking the pipeline states of the design into micro stages described herein will provide a state of the art simulation of the pipeline micro stages for different unit simulation drivers and monitors for unit verification. The instruction pipeline will monitor the reject events, branch wrong early and late events, and stall events and xcond events and correlate them to the instructions and mark each instruction with their corresponding states during simulation. Drivers will know which instruction has just been recycled and redispatch the instructions and monitors will know which signals should have been on or off by looking at the particular stage of the instruction pipeline.

In accordance with the preferred embodiment of this invention, it is possible to develop an instruction pipeline to correlate multiple events like cache rejects, instruction rejects, stalls, branch wrongs and xconds to simulated instructions and provide state of the art pipeline stages for drivers and monitors for unit simulation. When a cache reject occurs, the instruction pipe will assign a recycle counter to each of events, and then define a recycle train for the instruction streams. Once the counter reaches a certain value with the corresponding events, instructions that are on the recycled train will then be put into a pre-dispatching stage, and the drivers will redispatch them in the units for simulation. The events are correlated in the instruction pipe so that if instruction that is already on a wrong path branch will ignore the cache rejects. Or an instruction that is on the recycled train will be ignored if there is an branch wrong associated with it. The advantage of using this invention is to provide pipe line controls over the instruction streams, provide accurate count downs of each instruction states so driver and monitors at the unit simulation level can plug into the pipe line and monitor the behavior of the logic design more accurately. The pipe line provides accurate states of each instruction during simulation and the corresponding signals can be monitored very easily. Smaller logic verification units are carved out in the state diagrams of an instruction train with drivers and monitors attaching to the micro states. The instruction's endop state, check point state or recycle state, or the store of data, and the update of the registers can be monitored very easily. Unit sim (simulation) drivers can plug into the instruction pipe to determine whether the instruction will need to be redispatched, will need to fetch data, and then drive rejects and branch wrongs accordingly. Without these unifying counters in the instruction pipe, drivers and monitors would have to keep counters for each to themselves to keep track of when to drive the signals and monitor the signals. This instruction pipe provides the pipe lines for several units simulation like the instruction decode units, execution units, and it can work for other units as well. This has simplified the verification of the complex processor designs at unit level.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

The described method and apparatus for an instruction pipeline allows smaller unit simulations to correlate to the events of the instructions in the pipeline without rewriting many of the duplicate functions in different unit environment verifications.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 illustrates the pipeline states for out of order executions.

The detailed description explains the preferred embodiments of the invention, together with advantages and features, by way of example with reference to the drawings.

DETAILED DESCRIPTION OF THE INVENTION

Figure 1:
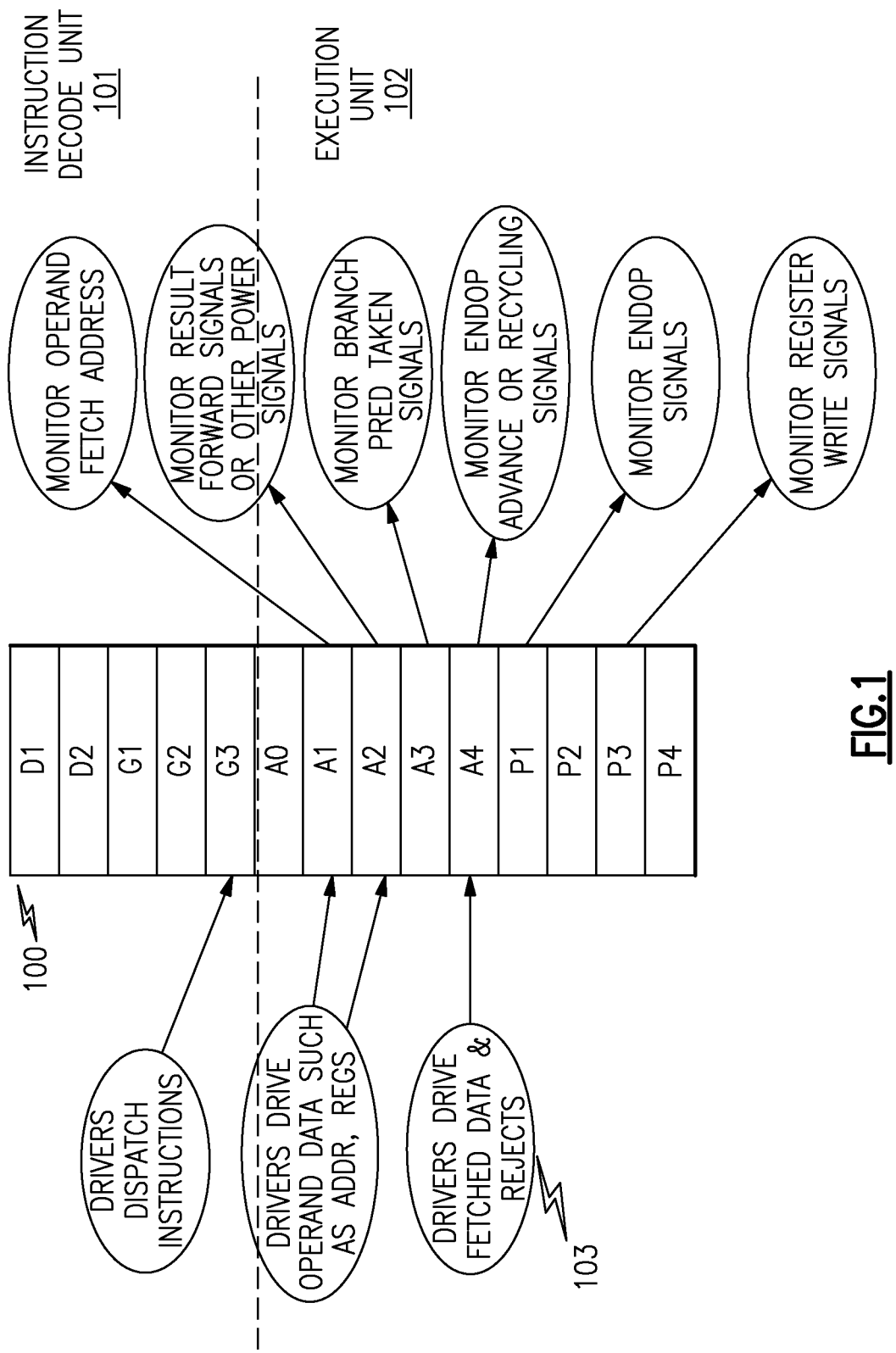
FIG. 1 illustrates one example of the instruction pipeline states during simulations.

Turning now to the drawings in greater detail, it will be seen that in FIG. 1 there is 100 containing the detail states of the instruction pipelines in our system. Each of the states is a typical simulation cycle. D1, D2 mean that they are the simulation cycles between the instruction Itext valids until the first grouping cycles (groups of the super scalar instructions). The instruction grouping and dispatching are also done in 3 cycles (G1/G2/G3). A0-A3 are the addresses generations cycles (data returns from caches), A4 is the execution cycle, P1-P3 are the endop and put away states, P4 is the check point state.

In accordance with our preferred embodiment, the Instruction Pipe handles the events like cache rejects, instruction rejects, decode stalls, early and late branch wrongs and xconds and correlate them to the instruction streams and tag each instruction in the pipe line with the corresponding states. When a cache reject comes on, a reject counter has started to count and allow certain number of reject cycles, these reject cycles matched hardware reject pipeline, before the reject counter resets back to 0, any rejects that come in between will be ignored, and if reject occurs on a wrong path instruction, it will also be ignored. When a reject or branch wrong is seen, the instruction will be "tagged"(advance to next state), subsequent instructions will also be 'tagged', while the count is non-zero. The pipe will continue to advance. For recycle, once the instruction makes it to P1 state, it will be 'routed' back to G1 state (the tag is used to determine that), for branch_wrong, we immediately flush the pipe of instructions prior to A0 state (on the cycle following branch wrong). We then allow instructions including and after A0 to flow all the way through the pipe (R3), for reject/recycle, every instruction is tagged with being recycled, for branch_wrong, it's tagged with an on_branch_wrong_path. For partial rejects on a multiple execution ops, there is a separate 'sub-state' state machine that counts the complete (assume 9 for complete) cycles. The original instr might require many more cycles. For example. it could require 23 cycles and get a partial recycle for every execution cycle. So the states would look like: E1[1 ... 9]—E2[1 ... 9]→E3[1 ... 9] ... →E23[1 ... 9]. And then the subsequent instructions will be moved into the pre-dispatching state. For xconds, if it is a completion xcond, subsequent instructions will be put into the instruction fetching states, and if it is a nullify xconds, the instruction that has xcond will also be put into the i-fetching state. For out of order execution instructions, its states will extend with the number of out of order wait states and when the previous op had moved into the endop state and the out of order op will then moved into the endop state.

The Figures are drawn to show the states of the instruction pipe. In FIG. 1, each state represents a simulation cycle. And unit simulation drivers and monitors each attach to the pipeline states to drive and monitor the corresponding functional signals. And the PipeLine can be cut into 2 units for example, instruction decode unit and execution unit. Instruction decode unit will contain the functions like instruction fetches and address generations and decodes, and the execution units contains functions after the dispatching of the instructions, executions of the instructions, endops and checked point state. Monitors will then plug into the instruction pipe to detect certain invalid behavior of the logic design. For example, if an instruction has reached its P1 state, the monitor would expect the endop signal to come on for that instruction and when it reaches P4 state, the check point signal should be on and so on. The instruction pipe had laid out every states of the instruction so the functions around the units can look into it and verify the corresponding logic. Smaller logic verification units are carved out for an instruction train with drivers and monitors attaching to the micro states.

In our simulation environment, illustrated in FIG. 1 we have divided the simulation units into 2 units. 101 has the instruction decode unit containing the states from D1 to A3. 102 has the execution unit containing the states from G3 to P4. 103 shows one of the examples that the execution unit driver is driving fetch data and rejects during the state of A3.

Figure 2:
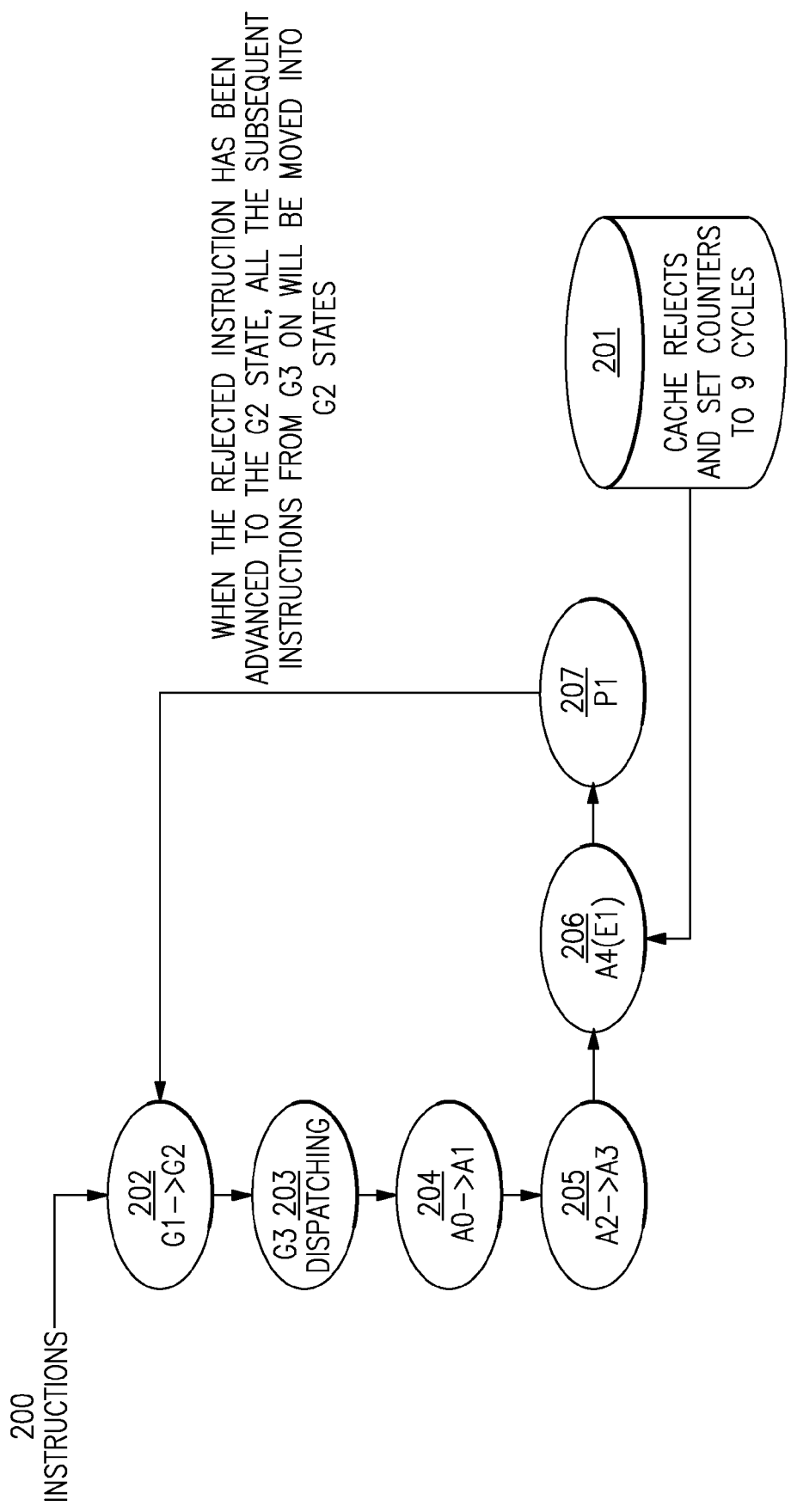
FIG. 2 illustrates one example of how each instruction in the pipeline will transition when there is a cache reject comes on during the pipeline simulation.

FIG. 2. Shows the pipeline states during a full cache reject in execution unit. A instruction in A4 state 206 can get a full cache reject, when the reject signal comes on, this rejected instruction will continue to move to 1 more state in P1 and then it will be rested in G2 state until the recycle counter has reached 9 (9 is the minimum instruction recycle span from cache data reject to data return from cache). The subsequent instructions that have been already dispatched from G3 will be moved into the G2 state for dispatching. The execution unit driver will redispatch the rejected instruction with the first G2 state of the instruction and instruction decode unit will monitor either the fetch/store data addresses at 9 cycles later after the rejects. At FXU unit simulation, the pipeline structure of the instruction steams provide the extra correctness check for the driver and hardware. For example, if the rejected instruction has been in G2, when the InstrPipe sees a dispatch signal, it moved the first G2 instruction into G3, but if the unit sim driver did not drive the correct instruction from the pipeline, the branch prediction taken signal could be mis-compared. If the unit driver matches the pipeline and drove the first instruction already 4 cycles after the rejects, and we are still seeing endop signals coming from hardware, we know the hardware logic did not get clean up during the recycle and there is a bug in the design.

Figure 3:
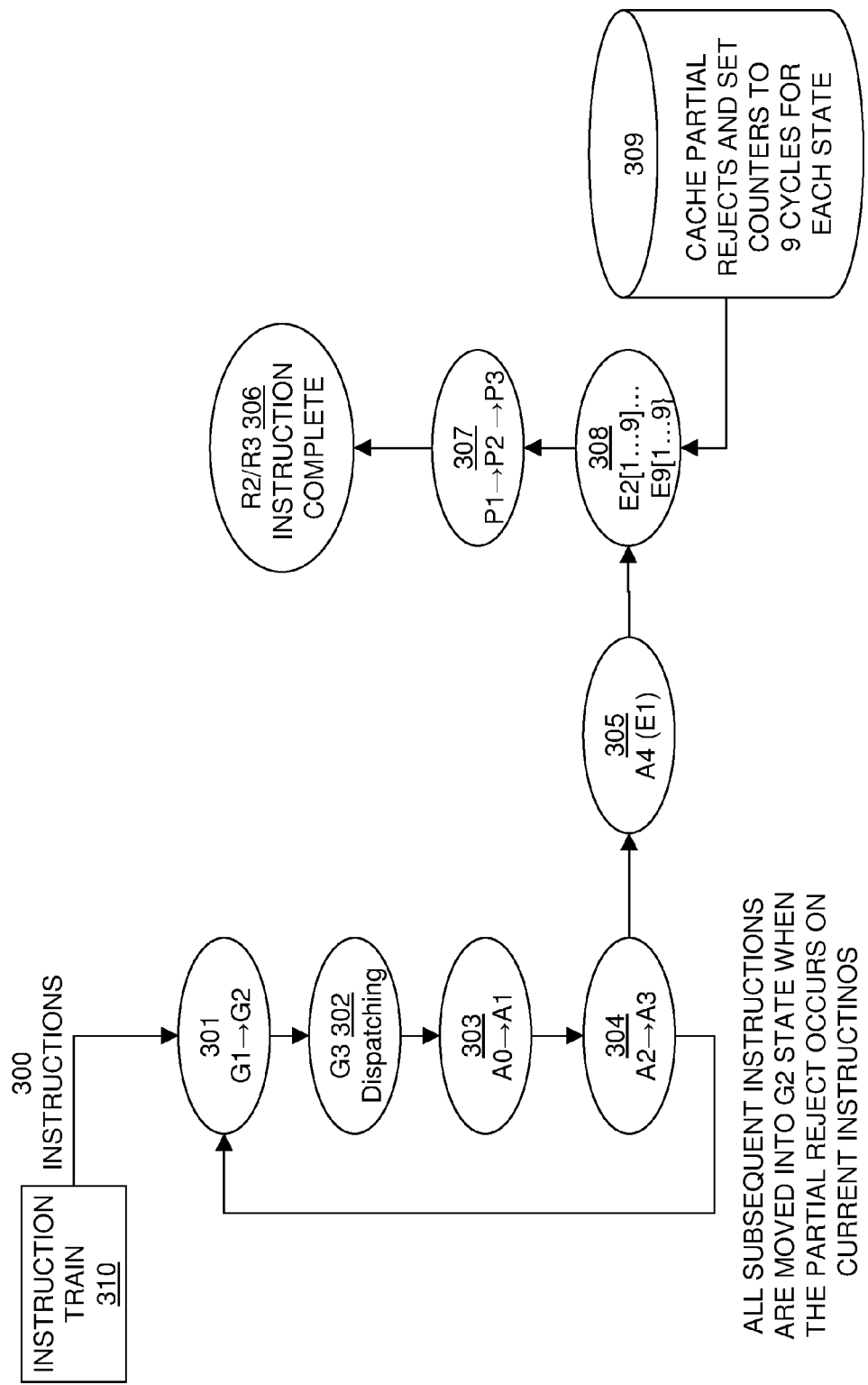
FIG. 3 illustrates one example of how each instruction in the pipeline will transition when there is a partial cache reject comes on during pipeline simulation.

FIG. 3 shows a partial reject diagram for the instruction train 310 during simulation. A multiple cycle execution op is qualified for partial reject. When the cache reject or line reject come on the second execution cycle and beyond, it is called a partial reject. Instruction that is having a partial reject do not go into recycle. It stays on for 9 cycles at E2 state shown in 308 until the good cache data returns at 9 cycles, during this time, all the subsequent instructions shown from 301 to 304 will moved into the G2 state for redispatching. If the multicycle instruction has 4 execution cycles, and 2nd execution cycle received a partial reject, the pipeline will hold 9 cycles until good data returns, and when it gets to execute the 3rd execution cycle, if there is another partial reject comes in, the InstrPipe will hold another 9 cycles until good data returns, all these time, the subsequent instructions should remain in G2 state.

Figure 4:
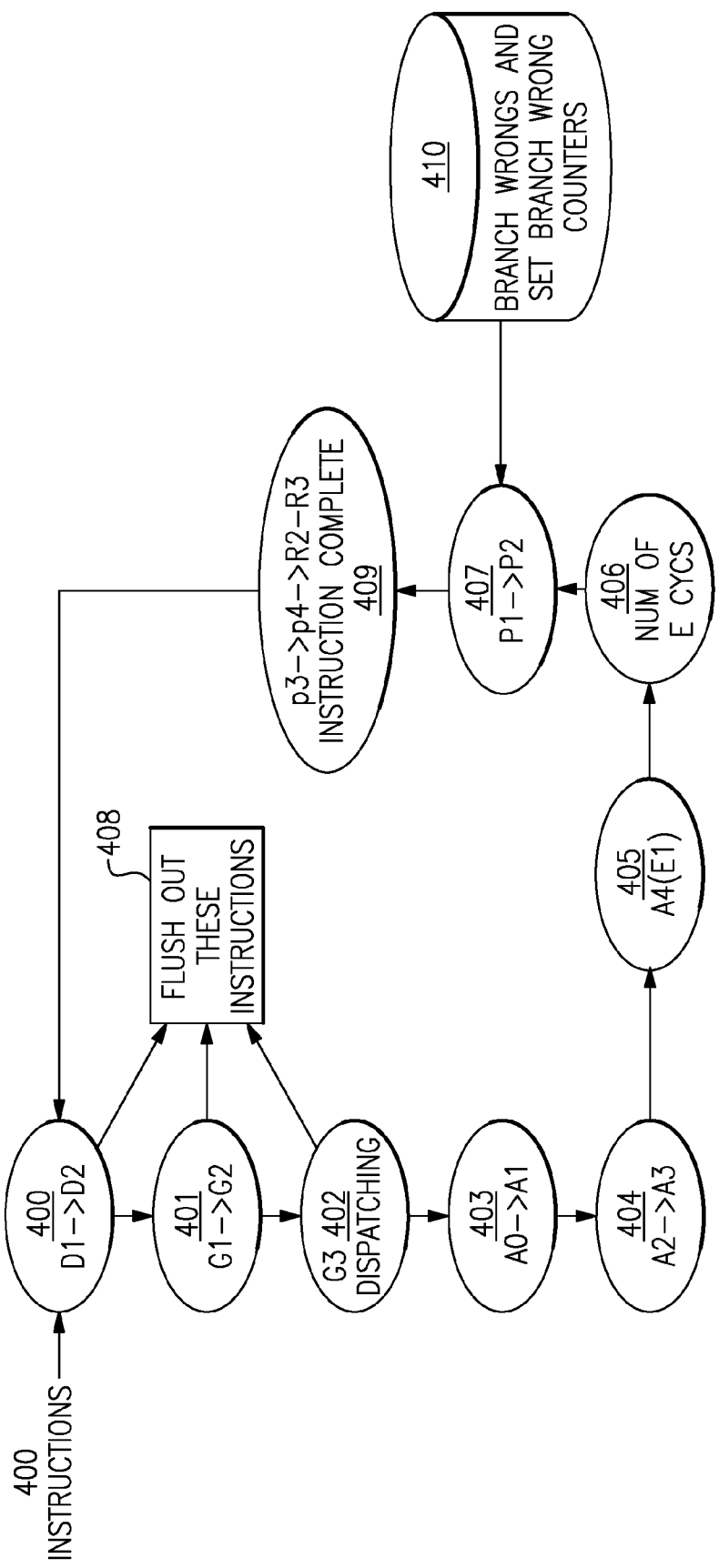
FIG. 4 illustrates one example of how each instruction in the pipeline will transition when there is a stall occurs to one of the instructions during pipeline simulation.

FIG. 4 illustrates what occurs if branch wrongs occur for the instructions within the instruction pipeline. After a instruction has been detected with wrong direction or wrong target (shown in 407), all subsequent instructions after this branch instruction will have to be refetched from instruction fetch unit. Instructions with states D1 to G3 will be flushed out of the pipeline since these are junk instructions. The next good instruction will be placed in D1 four cycles later so it can be redispatched when the branch wrong count reaches to 9. When branch wrong signal has come on, all the instructions will be expected to be refetched. And the branch wrong instruction itself should continue to finish (409). If hardware logic continued to raise write enables for the registers for the subsequent instructions, or checked point the next instruction, the monitors that have been hooked to the InstrPipe can pinpoint the bug easily by looking at the instructions trains since all instructions after the branch wrong instructions will be marked as junk instructions, the InstrPipe allowed the instruction train to propagate a couple more cycles with the counter so unit monitors can check the necessary hardware functions.

Figure 5:
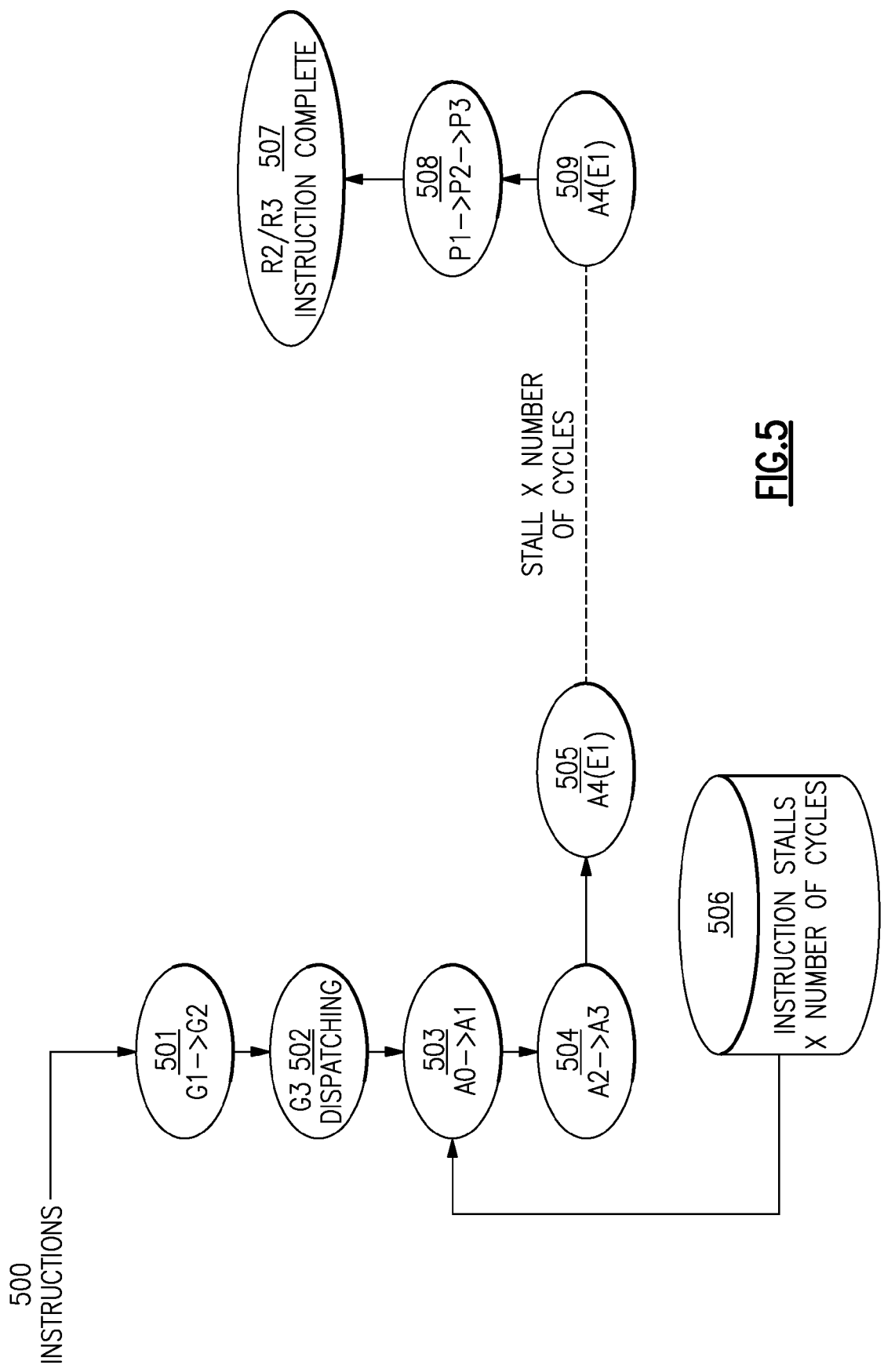
FIG. 5 illustrates one example of how each instruction in the pipeline will transition when there is a stall occurs to 1 of the instruction during pipeline simulation.

FIG. 5 shows instruction pipeline states during stall. Instruction decode unit can issue stall for any multi-cycle execution instructions, and in such case, the InstrPipe will hold extra execution state as long as the stall signal is on. And in such case, the number of execution cycles have been increased due to stall, the monitors will use the instruction pipeline information to detect if early endop occurs from hardware logic and signal a bug situation. 506 shows the stall comes on A2 from instruction decode unit to execution unit, and 505 to 509 shows the stall execution cycles in the pipeline. When the instruction had completed execution and reached P1 state, we would have expected instruction to endop, if the endop signal is not on, a hardware bug will be uncovered.

Figure 6:
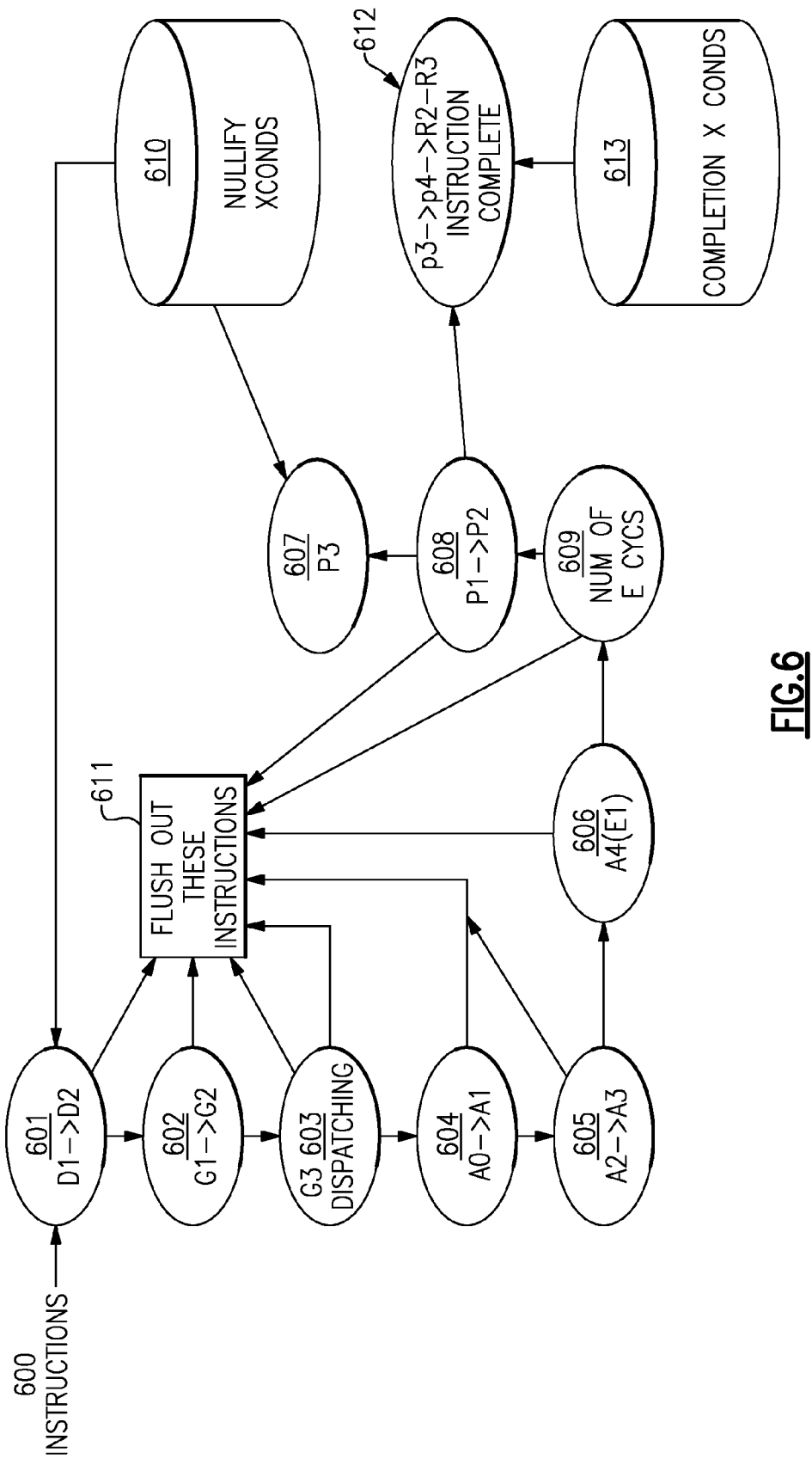
FIG. 6 illustrates how each instruction in the pipeline will transition when there is a xcond occurs to one of the instructions during pipeline simulation.

FIG. 6 shows instruction pipeline took an xcond and it is also called exception or serialization or pre-condition. From an IBM proposed CISC architecture, some exceptions are complete and some exceptions are nullified. When instructions encounter a completion xcond (613), they will be continued to move on into the pipeline states and completed and put away. The subsequent instructions are put back into the D1 state and it is pretended that it has just been fetched. When instructions encounter a nullify xcond, they will be sent back to D1 state as being just fetched shown 610. And due to the architecture, sometimes instructions will be redispatched in slow mode so the whole instruction pipe will have to be flushed out. And the xconded instruction will be put in D1 and dispatched by itself and until it has completed execution and put away.

FIG. 7 shows the pipeline states for out of order executions, as are commonly employed in RISC processors. The out of order execution instruction is dispatched at G3 shown in 703, every states are the same for the "ooo" instruction except the extra out of order execution wait cycles have been added to the E1 (is also A4 state) shown in 709. The function around these signals will be monitored for the "ooo" verification. If the checked point signal going to recovery unit comes on the cycle P4, the instruction pipeline is being searched to find any instruction on P4, if no instruction is at P4 state, a mis-compare error message is outputted to indicate the hardware bug. If the out of order wait cycles are out of "syn" with the instruction pipeline, for example, a fixed point float instruction load and test (LTER) needs 9 execution cycles, and Load instruction only requires 1 execution cycle, The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the method used in the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for a simulation model of a hardware design being verified, comprising:
   receiving a pipeline state for unit verification and an instruction train for hardware verification events, said instruction train including handling of instruction rejects, partial rejects, stalls, branch wrongs, and exceptions;
   simulating a design comprising the pipeline state and the instruction train by an instruction pipeline, the instruction pipeline comprising an instruction decode unit, an execution unit, and a plurality of instructions;
   monitoring correctness of the design being simulated by simulation monitors and drivers;
   detecting by said simulation drivers and monitors unexpected hardware signals based on hardware signal events occurring for any one of the plurality of instructions in the instruction pipeline;
   initiating a reject counter based on a cache reject event;
   continuing to advance the instruction pipeline after initiating the reject counter; and
   tagging each of the plurality of instructions in the pipeline with a state, the tagged states including each of cache rejects, instruction rejects, decode stalls, early and late branch wrongs and xconds.

2. The method according to claim 1 wherein for each unit verification the drivers and the simulation monitors perform verification without having to restructure the instructions in the instruction pipeline due to rejects, partial rejects, stalls, branch wrongs.

3. The method according to claim 1 wherein event counters are placed in the instruction pipeline when the hardware signal events occur and expand the instruction train such that the instruction train provides an accurate state of each instruction so hardware logic signals and data can be tracked and identified from the tagged states.

4. The method according to claim 3 wherein during execution of a branch wrong for one instruction and cache reject for another instruction, the instruction pipeline prioritizes the events and redefines the instruction train to present to the simulation monitors and drivers a corrected instruction recycle train of events.

5. The method according to claim 1 wherein said each of said plurality of instructions comprises tags, said simulation monitors and drivers detecting unexpected hardware signals, using the tags, said detecting to based on the hardware signal events.

6. The method according to claim 1 wherein an instruction train contains a list of instructions with micro states attached to each of them as an instruction recycle train is redefined during full cache rejects.

7. The method according to claim 1 wherein an instruction train contains a list of instructions with micro states attached to each of them as an instruction partial recycle train is redefined during partial cache rejects.

8. The method according to claim 1 wherein an instruction train contains a list of instructions with micro states attached to each of them as an instruction branch wrong train is redefined during a branch wrong or wrong target.

9. The method according to claim 1 wherein an instruction train contains a list of instructions with micro states attached to each of them as an instruction stall train is redefined during instruction stalls.

10. The method according to claim 1 wherein an instruction train contains a list of instructions with micro states attached to each of them as an instruction exception train is redefined during instruction exceptions and serializations and upon a pre-condition.

11. The method according to claim 1 wherein an instruction train contains a list of instructions with micro states attached to each of them as an instruction train is out of order pipeline redefined during executions of out of order instructions.

12. An computer program product for logic verification, the computer program product comprising:
a tangible storage medium not including signals, readable by a processing circuit and storing instructions for execution by the processing circuit for performing a method comprising
receiving a pipeline state for unit verification and an instruction train for hardware verification events, said instruction train including handling of instruction rejects, partial rejects, stalls, branch wrongs, and exceptions;
simulating a design comprising the pipeline state and the instruction train by an instruction pipeline, the instruction pipeline comprising an instruction decode unit, an execution unit, and a plurality of instructions;
monitoring the instruction pipeline for correctness of the design being simulated by simulation monitors and drivers;
detecting by said simulation drivers and monitors unexpected hardware signals based on hardware signal events occurring for any one of the plurality of instructions in the instruction pipeline;
initiating a reject counter based on a cache reject event;
continuing to advance the instruction pipeline after initiating the reject counter; and
tagging each of the plurality of instructions in the pipeline with a state, the tagged states including each of cache rejects, instruction rejects, decode stalls, early and late branch wrongs and xconds.

13. The computer program product according to claim 12, wherein based on detecting a cache reject, said reject counter is configured to:
match a number of reject cycles to a hardware reject pipeline, based on beginning a count;
ignore rejects occurring on a wrong path instruction; and
based on beginning the count and prior to resetting the count to 0, the reject counter is further configured to ignore rejects.

14. The computer program product according to claim 12, wherein said pipeline is advanced, and based on detecting a reject or branch wrong, the plurality of instructions are tagged while the count is non-zero, and the pipeline continues to advance.

15. The computer program product according to claim 12, wherein for a recycle, once one of the plurality of instructions makes it to a first state, it will be routed back to an earlier state.

16. The computer program product according to claim 12, wherein for a branch wrong, the apparatus performs a flush of the instruction pipeline and allows instructions to flow through the instruction pipeline.

17. The computer program product according to claim 12 wherein for an instruction recycled, recycled instruction is tagged with being recycled, and wherein for branch_wrong instructions, the branch wrong instructions are tagged with an on_branch_wrong_path tag.

18. An apparatus for logic verification comprising:
a processor including an instruction pipeline;
an instruction pipeline comprising an instruction decode unit in communication with an execution unit and a reject counter; and
a plurality of simulation drivers and monitors attached to the instruction pipeline, the apparatus configured to perform a method comprising:
receiving a pipeline state for unit verification and an instruction train for hardware verification events, said instruction train including handling of instruction rejects, partial rejects, stalls, branch wrongs, and exceptions;
simulating a design comprising the pipeline state and the instruction train by the instruction pipeline, the instruction decode unit, and the execution unit;
monitoring correctness of the design being simulated by the simulation monitors and drivers;
detecting by said simulation drivers and monitors unexpected hardware signals based on hardware signal events occurring for any one of the plurality of instructions in the instruction pipeline;
initiating a reject counter based on a cache reject event;
continuing to advance the instruction pipeline after initiating the reject counter; and
tagging each of the plurality of instructions in the pipeline with a state, the tagged states including each of cache rejects, instruction rejects, decode stalls, early and late branch wrongs and xconds.

19. The apparatus according to claim 18, wherein based on detecting a cache reject, said reject counter is configured to:
match a number of reject cycles to a hardware reject pipeline, responsive to beginning a count;
ignore rejects occurring on a wrong path instruction; and
based on beginning the count and prior to resetting the count to 0, the reject counter is further configured to ignore rejects.

20. The apparatus according to claim 18, wherein for branch wrong, the apparatus performs a flush of the instruction pipeline and allows instructions to flow through the instruction pipeline.

* * * * *